Oct. 28, 1924.
H. O. RUSSELL ET AL
ELECTRICAL TACHOMETER
Filed March 9, 1922
1,513,071
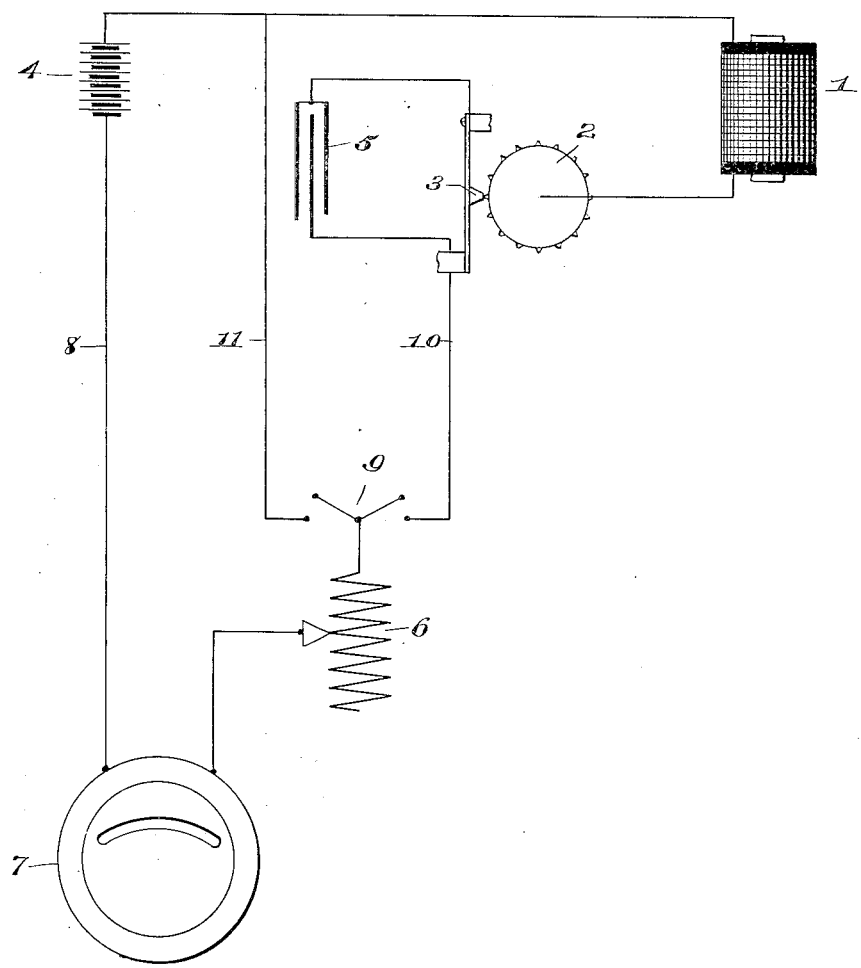
Inventors:
H. O. Russell
E. A. Sipp
By Robert H Young Atty.

Patented Oct. 28, 1924.

1,513,071

UNITED STATES PATENT OFFICE.

HERBERT O. RUSSELL, OF DETROIT, MICHIGAN, AND EDWARD A. SIPP, OF DAYTON, OHIO.

ELECTRICAL TACHOMETER.

Application filed March 9, 1922. Serial No. 542,504.

*To all whom it may concern:*

Be it known that we, HERBERT O. RUSSELL and EDWARD A. SIPP, citizens of the United States, residing, respectively, at Detroit and Dayton, in the counties of Wayne and Montgomery and States of Michigan and Ohio, have invented certain new and useful Improvements in Electrical Tachometers, of which the following is a specification.

This invention relates to an electrical tachometer for indicating the revolutions per minute of any rotatable part and particularly the crank shaft of an aeronautical engine such as is now commonly used in the propulsion of aircraft. The principle on which the improved tachometer is based is the rate of charge of the inductance, and hence voltage in a primary inductance coil, when the electrical circuit is made and broken.

The improved mechanism eliminates the use of a flexible shaft or any other type of electrical generator and is particularly well adapted to measuring the speed of any revolving mechanical device or machine at a great distance therefrom. The mechanism also admits of the ready and accurate calibration of the recording meter or indicator at any time or for any particular installation.

With the above and other objects in view, the invention consists in the novel construction, combination and arrangement herein fully described, illustrated and claimed.

The accompanying drawing represents a view partly in elevation and partly in diagram of the improved device.

The mechanism or apparatus embodies an induction coil 1, a multiple-lobe cam 2, spring actuating breaker points 3, a rheostat 6 which is manually controlled, a voltmeter 7 graduated to read in R. P. M., a source of electrical energy such as a battery 4, and a circuit 8, in which is placed a single pole double throw switch 9.

The operation of the device is dependent primarily upon a constant voltage source of electrical energy and the number of times the circuit is opened and closed per unit time by means of the revolving multiple-lobe cam and spring actuated breaker points. The variation in voltage due to the rate of change of the inductance in the coil and circuit per unit time is recorded on the voltmeter 7. The lead 8 and switch 9 are placed in the system in order to show and regulate the voltage to a definite pre-determined value in the circuit while the device is in operation. The lead 11 must have been used previously when the meter was calibrated at the definite predetermined value of voltage and its length cannot be changed without re-calibrating the meter 7. Without the lead 8 and single pole double throw switch 9 the meter must be calibrated for a predetermined voltage value when the current is made in the circuit at the contact points 3. The device cannot be in operation when this latter method of calibration is made.

We claim:

1. An electrical tachometer comprising a constant voltage source of electrical energy, circuit making and breaking mechanism adapted to be operated by the member the number of revolutions of which the said tachometer is designed to indicate, an electrical indicator, an induction coil, an electrical circuit including said source of energy, said make and break mechanism, said indicator and said coil, a second circuit including said source of energy, said indicator and a resistance, a double throw switch adapted to close said second circuit to include said resistance to regulate the voltage while the tachometer is in operation.

2. An electrical tachometer comprising a constant voltage source of electrical energy, circuit making and breaking mechanism adapted to be operated by the member, the number of revolutions of which the said tachometer is designed to indicate, an electrical indicator graduated in R. P. M., an induction coil, an electrical circuit including said source of energy, said make and break mechanism, said indicator and said coil, a second circuit including said source of energy, said indicator and a resistance, a double throw switch adapted to close said second circuit to include said resistance to regulate the voltage while the tachometer is in operation.

In testimony whereof we affix our signatures.

HERBERT O. RUSSELL.
EDWARD A. SIPP.